(12) United States Patent
Iwakiri (10) Patent No.: US 6,815,703 B2
(45) Date of Patent: Nov. 9, 2004

(54) STIMULABLE PHOSPHOR SHEET STORING CASSETTE, RADIATION IMAGE PHOTOGRAPHING APPARATUS, PHOTOGRAPHING INFORMATION REGISTRATION APPARATUS, AND RADIATION IMAGE INFORMATION READING APPARATUS

(75) Inventor: Naoto Iwakiri, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 131 days.

(21) Appl. No.: 09/986,411

(22) Filed: Nov. 8, 2001

(65) Prior Publication Data

US 2002/0053650 A1 May 9, 2002

(30) Foreign Application Priority Data

Nov. 8, 2000 (JP) .................................... 2000-340069

(51) Int. Cl.[7] ............................................. G03B 42/02
(52) U.S. Cl. ...................................................... 250/588
(58) Field of Search ................................. 250/588, 584, 250/585, 586

(56) References Cited

U.S. PATENT DOCUMENTS

| 4,258,264 A | | 3/1981 | Kotera et al. |
| 4,276,473 A | | 6/1981 | Kato et al. |
| 4,387,428 A | | 6/1983 | Ishida et al. |
| 4,760,256 A | * | 7/1988 | Ohgoda et al. ............. 250/588 |
| 4,849,630 A | | 7/1989 | Fukai et al. |
| 5,233,555 A | * | 8/1993 | Aonuma ..................... 365/106 |
| 5,308,994 A | | 5/1994 | Ohta et al. |
| 5,592,374 A | * | 1/1997 | Fellegara et al. ............. 705/3 |
| 5,627,381 A | * | 5/1997 | Kulpinski ................... 250/588 |
| 5,661,309 A | * | 8/1997 | Jeromin et al. ............ 250/580 |
| 5,877,501 A | * | 3/1999 | Ivan et al. ............. 250/370.09 |
| 6,239,447 B1 | * | 5/2001 | Toda .......................... 250/584 |
| 6,373,074 B1 | * | 4/2002 | Mueller et al. ............ 250/584 |
| 6,432,576 B1 | * | 8/2002 | Hikmet ....................... 429/162 |
| 6,528,812 B1 | * | 3/2003 | Leblans et al. ............ 250/588 |

FOREIGN PATENT DOCUMENTS

| JP | 55-12429 | 1/1980 | ............ G01T/1/10 |
| JP | 55-116340 | 9/1980 | ............ A61B/6/00 |
| JP | 56-104645 | 8/1981 | ............ A61B/6/00 |

* cited by examiner

Primary Examiner—Albert Gagliardi
(74) Attorney, Agent, or Firm—Sughrue Mion, PLLC (57) ABSTRACT

A cassette is provided having an emitter for emitting an erasing light to release residual radiation energy from a stimulable phosphor sheet stored therein does not need to be conveyed to a power supply unit, and in which an emission time of the emitter can be controlled appropriately. The cassette storing the sheet for recording a radiation image therein and comprising a stimulable phosphor layer formed on a substrate thereof has the emitter for irradiating the erasing light on the sheet and a power supply for causing the emitter to emit the erasing light, and a control circuit for controlling the emission time.

38 Claims, 7 Drawing Sheets

STIMULABLE PHOSPHOR SHEET STORING CASSETTE, RADIATION IMAGE PHOTOGRAPHING APPARATUS, PHOTOGRAPHING INFORMATION REGISTRATION APPARATUS, AND RADIATION IMAGE INFORMATION READING APPARATUS

BACKGROUND OF THE INVENTION

1. Field of the Invention

The present invention relates to a cassette for storing a stimulable phosphor sheet and used for photographing a radiation image. More specifically, the present invention relates to a cassette comprising means for erasing radiation energy remaining in a stimulable phosphor sheet stored therein.

The present invention also relates to a radiation image photographing apparatus for photographing (recording) a radiation image in the stimulable phosphor sheet stored in the cassette.

Furthermore, the present invention relates to a photographing information registration apparatus for registering photographing information regarding the stimulable phosphor sheet stored in the cassette.

Moreover, the present invention also relates to a radiation image information reading apparatus for reading radiation image information recorded in the stimulable phosphor sheet stored in the cassette.

2. Description of the Related Art

There has been known stimulable phosphor storing a portion of energy of radiation irradiated thereon and emitting phosphorescent light in accordance with the stored radiation energy upon exposure to an excitation light such as visible light and a laser beam. Consequently, radiation image recording/reproducing systems using stimulable phosphor sheets having the stimulable phosphor on substrates thereof have been in wide use.

A radiation image recording reproducing system records radiation image information of a subject such as a human body in a stimulable phosphor sheet by irradiating radiation that has passed through the subject on the sheet. Thereafter, the stimulable phosphor sheet is scanned two-dimensionally with an excitation light such as a laser beam to cause the sheet to emit phosphorescent light from an area where the excitation light is irradiated, and the phosphorescent light is read by photoelectric reading means. In this manner, an image signal representing the radiation image information is obtained by the radiation image recording/reproducing system (see Japanese Unexamined Patent Publication Nos. 55(1980)-12429, 55(1980)-116340, and 56(1981)-104645, for example).

The image signal obtained by the system in the above manner is subjected to image processing such as tone processing and frequency processing appropriate for observing a radiation image represented by the image signal, and the image is reproduced as a visible image on a film or displayed on a CRT display device for diagnosis.

The stimulable phosphor sheet can be used repeatedly for recording radiation image information again if an erasing light for releasing radiation energy remaining in the sheet is irradiated on the sheet after reading. However, even if the erasing process described above is carried out after reading, radiation energy is often stored in the sheet by being exposed to natural radiation before the sheet is used for recording radiation image information again. Therefore, even in the case where the stimulable phosphor sheet has already been subjected to the erasing process (primary erasing process), the erasing process is generally carried out again (secondary erasing process) immediately before the stimulable phosphor sheet is reused for recording radiation image information.

As has been described in U.S. Pat. No. 4,849,630 for example, the stimulable phosphor sheet is often stored in a light-shielding cassette. The cassette stores only one sheet and usually comprises a casing box having an opening for inserting or taking out the sheet and a lid for opening or closing the opening.

When a radiation image is photographed (recorded) by using such a cassette, the cassette is placed in a position where radiation that has passed through a subject is irradiated, for example. In this manner, the radiation is irradiated on the stimulable phosphor sheet stored in the cassette, and the radiation image is recorded in the sheet.

The cassette after photographing the radiation image is set in a radiation image information reading apparatus, as has been described in U.S. Pat. No. 5,308,994, for example. The stimulable phosphor sheet is taken out from the cassette and subjected to radiation image information reading processing.

Meanwhile, for the stimulable phosphor sheet that has the radiation image recorded therein, information such as a name and a body portion of the subject and a radiation dosage needs to be specified for the subsequent radiation image information reading and sheet management. In many cases, subject information such as the name and gender of the subject and ID (identification) information including photographing information such as the date of photographing and the photographed body portion is registered with a photographing information registration apparatus. The photographing information registration apparatus is placed together with or connected to the radiation image photographing apparatus. The photographing information registration apparatus is connected to the radiation image information reading apparatus in some cases so that a radiation image information reading condition can be determined based on the photographing information.

In the case where the stimulable phosphor sheet is stored in the cassette, the subject information and the photographing information is often represented by a bar code and the bar code is pasted to the cassette.

Meanwhile, the time necessary for the erasing process such as the primary erasing and the secondary erasing is substantially long compared to the time necessary for the radiation image information reading process. This fact has been hampering the processing ability of the radiation image recording/reproducing system using a stimulable phosphor sheet. In consideration of such a situation, a cassette comprising an emitter for the erasing process has been proposed as in U.S. Pat. No. 4,849,630, aiming at an improvement of the erasing process.

Although the cassette having the emitter can achieve a predetermined object, the cassette needs to be brought to a power supply unit for supplying an electric current to the emitter. Furthermore, appropriate control of emission time of the emitter is difficult. With regard to these points, there remained room for improvement.

SUMMARY OF THE INVENTION

The present invention has been conceived based on consideration of the above circumstances. An object of the present invention is therefore to obviate the conveyance of a cassette having an erasing ray emitter to a power supply, and to appropriately control an emission time of the emitter.

Another object of the present invention is to provide a radiation image photographing apparatus, a photographing information registration apparatus, and a radiation image information reading apparatus enabling appropriate control of the emission time of the emitter from outside of the cassette.

Still another object of the present invention is to provide a radiation image photographing apparatus and a photographing information registration apparatus not hampering photographing of a radiation image even if the emission time is controlled.

A cassette of the present invention is a cassette for storing a stimulable phosphor sheet having a stimulable phosphor layer formed on a sheet-like substrate and used for recording a radiation image therein, and the cassette comprises:

an emitter for emitting an erasing light to the sheet stored in the cassette;

a power supply for causing the emitter to emit the erasing light; and a control circuit for controlling a time of emission from the emitter powered by the power supply.

The control circuit controls the emission time based on control information input from outside of the circuit.

More specifically, a circuit for controlling the emission time based on control information output from an apparatus for photographing the radiation image on the stimulable phosphor sheet may be used as the control circuit. Alternatively, a circuit for controlling the emission time based on control information output from an apparatus for registering photographing information regarding the stimulable phosphor sheet, or a circuit for controlling the emission time based on control information output from an apparatus for reading radiation image information from the stimulable phosphor sheet may also be adopted as the control circuit, for example.

In the case where the control circuit for controlling the emission time based on the control information input from the outside of the circuit is used, means for receiving the control information input from the outside is necessary. As such means, a terminal for receiving the control information input from the outside, radio reception means according to a wireless communication standard such as Bluetooth, Wireless 1394, and IEEE 802.11, and infrared reception means according to an infrared communication standard such as IrDA may be used, for example.

As the power supply for causing the emitter to emit the erasing light, a rechargeable secondary battery such as a Li(lithium) -ion battery (especially a Li-ion polymer battery) is preferably used. In this case, it is preferable for the cassette of the present invention to comprise means for said secondary battery to receive a charging electric current supplied from outside of said secondary battery.

It is preferable for the emitter to comprise an organic EL (electroluminescence) material or non-organic EL material.

The emitter is preferably placed facing a surface of the stimulable phosphor sheet on a side of the stimulable phosphor layer. Alternatively, in the case where the cassette of the present invention stores the stimulable phosphor sheet having the stimulable phosphor layer formed on a substrate which allows the erasing light to pass through, the emitter may be placed facing a surface of the sheet on a side of the substrate or facing the sheet on both sides.

As has been described above, the stimulable phosphor sheet stored in the cassette of the present invention has the stimulable phosphor layer formed on the sheet-like substrate. However, in many cases, a protective layer or the like is also used. Therefore, the "surface of the sheet on the side of the stimulable phosphor layer" does not necessarily refer to a surface of the stimulable phosphor layer, but refers to a surface of the sheet to which the stimulable phosphor layer is placed closer than the substrate. Likewise, the "surface of the sheet on the side of the substrate" refers to a surface of the sheet to which the substrate is placed closer than the stimulable phosphor layer.

It is preferable for the cassette of the present invention to comprise display means for indicating that the emission is occurring and/or completed.

Furthermore, it is also preferable for the cassette of the present invention to further comprise time measuring means for measuring a time elapsed since completion of the emission and re-erasing control means for causing the emitter to emit the erasing light again when the elapsed time measured by the time measuring means reaches a predetermined time.

Moreover, it is also preferable for the cassette of the present invention to further comprise warning means for issuing a warning if the emitter is still emitting the erasing light when information indicating that the cassette is set in a photographing stand-by state is input thereto. In this case, the information may be input from the outside of the cassette. Alternatively, the cassette may comprise detection means for inputting the information to the warning means by detecting the stand-by state.

It is also preferable for the cassette of the present invention to further comprise emission stopping means for stopping the emission of the erasing light from the emitter if the emitter is still emitting the erasing light when information indicating that the cassette is in a stand-by state is input thereto. In this case, the information may be input from the outside of the cassette. Alternatively, the cassette may comprise detection means for inputting the information to the emission stopping means by detecting the stand-by state.

Meanwhile, a first radiation image photographing apparatus of the present invention uses the cassette comprising the control circuit for controlling the emission time based on the control information output from the radiation image photographing apparatus. The first radiation image photographing apparatus comprises means for inputting information related to a radiation dosage for the stimulable phosphor sheet as the control information to the control circuit of the cassette.

A second radiation image photographing apparatus of the present invention uses a cassette comprising a warning means for issuing the warning if the emitter is still emitting the erasing light when the information indicating the stand-by state of the cassette is input to the cassette. The second radiation image photographing apparatus comprises detection means for detecting the stand-by state of the cassette and for inputting the information indicating the stand-by state to the warning means of the cassette.

A third radiation image photographing apparatus of the present invention uses a cassette comprising an emission stopping means for stopping the emission from the emitter if the emitter is still emitting the erasing light when the information indicating the stand-by state of the cassette is input to the cassette. The third radiation image photographing apparatus comprises detection means for detecting the stand-by state of the cassette and for inputting the information indicating the stand-by state to the emission stopping means of the cassette.

A first photographing information registration apparatus of the present invention registers the photographing information regarding the cassette (that is, regarding the stimulable phosphor sheet stored therein) comprising the control circuit for controlling the emission time based on the control information output from the first photographing information registration apparatus. The first photographing information registration apparatus comprises means for inputting information related to a radiation dosage for the stimulable phosphor sheet as the control information to the control circuit of the cassette.

A second photographing information registration apparatus of the present invention registers the photographing information regarding the cassette (that is, regarding the stimulable phosphor sheet stored therein) comprising the warning means for issuing the warning if the emitter is still emitting the erasing light when the information indicating the stand-by state of the cassette is input to the cassette. The second photographing information registration apparatus comprises detection means for detecting the stand-by state of the cassette and for inputting the information indicating the stand-by state to the warning means of the cassette.

A third photographing information registration apparatus of the present invention registers the photographing information regarding the cassette (that is, the stimulable phosphor sheet stored therein) comprising the emission stopping means for stopping the emission from the emitter if the emitter is still emitting the erasing light when the information indicating the stand-by state of the cassette is input to the cassette. The third photographing information registration apparatus comprises detection means for detecting the stand-by state of the cassette and for inputting the information indicating the stand-by state to the emission stopping means of the cassette.

A radiation image information reading apparatus of the present invention is an apparatus for reading the radiation image information from the stimulable phosphor sheet stored in the cassette comprising a control circuit for controlling the emission time based on the control information output from the radiation image information reading apparatus. The radiation image information reading apparatus of the present invention comprises means for inputting information related to a dosage of radiation for the stimulable phosphor sheet as the control information to the control circuit of the cassette.

According to the cassette of the present invention, the cassette comprises not only the emitter for irradiating the erasing light to the sheet but also the power supply to cause the emitter to emit the erasing light. Therefore, an erasing process can be carried out on the stimulable phosphor sheet by supplying the electric current from the power supply to the emitter, without bringing the cassette to a power supply unit.

Furthermore, the cassette of the present invention comprises the control circuit for controlling the emission time of the emitter powered by the power supply. Therefore, the emission time can be controlled appropriately.

Each of the first radiation image photographing apparatus, the first photographing information registration apparatus and the radiation image information reading apparatus of the present invention using the cassette comprises the means for inputting the information related to the radiation dosage for the stimulable phosphor sheet as the control information to the control circuit of the cassette. Therefore, the emission time of the emitter of the cassette can be controlled appropriately from the outside of the cassette.

In the case where a rechargeable secondary battery is used as the power supply for causing the emitter to emit the erasing light, the power supply can be used repeatedly by recharging the battery, which is economical. Especially, in the case where the Li-ion polymer battery is used as the secondary battery, this battery can be formed extremely thin, as thin as 2~3 mm. Therefore, the cassette can also be thin and light. Furthermore, since the Li-ion polymer battery can also be formed to have a large area, the battery can be as large as up to an area of the stimulable phosphor sheet. As a result, the amount of the erasing light can be large. Furthermore, since the emission time can be longer, the interval between recharging operations can be longer.

Meanwhile, in the case where a non-organic or organic EL material is used for the emitter, the material can be shaped extremely thin. Therefore, the cassette can also be thin. Furthermore, the non-organic or organic EL material can be used without a driving circuit or a wire therefor. Therefore, even in the case where the radiation image is photographed in a state where the emitter comprising the non-organic or organic EL material is situated between the stimulable phosphor sheet and a radiation source, the photography of a driving circuit or a wire in the radiation image can be prevented.

If the emitter is placed facing the surface of the sheet on the stimulable phosphor layer side, the erasing light can be efficiently irradiated on the stimulable phosphor layer even if the erasing light cannot pass through the substrate of the sheet.

Meanwhile, if the cassette of the present invention stores the stimulable phosphor sheet having the stimulable phosphor layer formed on a substrate that allows the erasing light to pass through, the erasing light can be irradiated on the stimulable phosphor layer through the substrate even if the emitter is placed facing the surface of the sheet on the substrate side. In this case, if the emitter is also placed facing the surface of the sheet on the stimulable phosphor layer side, the erasing light can be irradiated on the stimulable phosphor layer from both sides. In this manner, the erasing process can be carried out efficiently in a short time.

If the cassette of the present invention comprises a display means for indicating that the emission is going on and/or completed, whether or not the erasing process on the stimulable phosphor sheet in the cassette has been completed can be judged easily. In this manner, the stimulable phosphor sheet can be prevented from being reused for photographing another radiation image without completion of the erasing process thereon.

If the cassette of the present invention comprises a time measuring means for measuring the time elapsed after completion of the emission and the re-erasing control means for causing the emitter to emit the erasing light again when the elapsed time measured by the time measuring means reaches the predetermined time, energy of natural radiation or the like can be released even if the energy is stored in the sheet which has been subjected to the erasing process. Therefore, the stimulable phosphor sheet can be used for photographing another radiation image in a state where a level of residual radiation energy is extremely low.

If the cassette of the present invention comprises a warning means for issuing a warning if the emitter is still emitting the erasing light when the information indicating the stand-by state of the cassette is input to the cassette, the stimulable phosphor sheet can be prevented from being reused for photographing another radiation image in a state where the erasing process is incomplete, that is, in a state where the level of the residual radiation energy is still high.

Each of the second radiation image photographing apparatus and the second photographing information registration apparatus of the present invention using the cassette comprises a detection means for detecting the stand-by state of the cassette and for inputting the information indicating the stand-by state to the warning means of the cassette. Therefore, a stimulable phosphor sheet whose residual radiation energy level is high can be prevented from being reused in the apparatus.

If the cassette of the present invention comprises an emission stopping means for stopping the emission from the emitter if the emitter is still emitting the erasing light when the information indicating the stand-by state of the cassette is input to the cassette, photographing of a radiation image can be prevented from being hampered in an emergency state, in which photography must be performed, due to the emission time control.

Each of the third radiation image photographing apparatus and the third photographing information registration apparatus of the present invention using the cassette comprises a detection means for detecting the stand-by state of the cassette and for inputting the information indicating the stand-by state to the emission stopping means of the cassette. Therefore, by use of the apparatus, the emission time control does not hamper radiation image photographing.

DESCRIPTION OF THE PREFERRED EMBODIMENT

Figure 1:
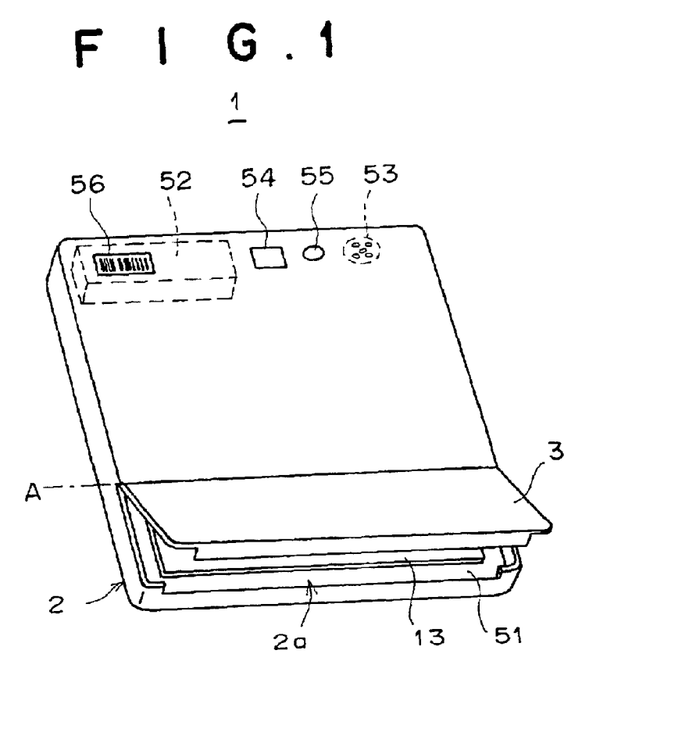
FIG. 1 is a perspective view of a cassette of the present invention.
Figure 2:
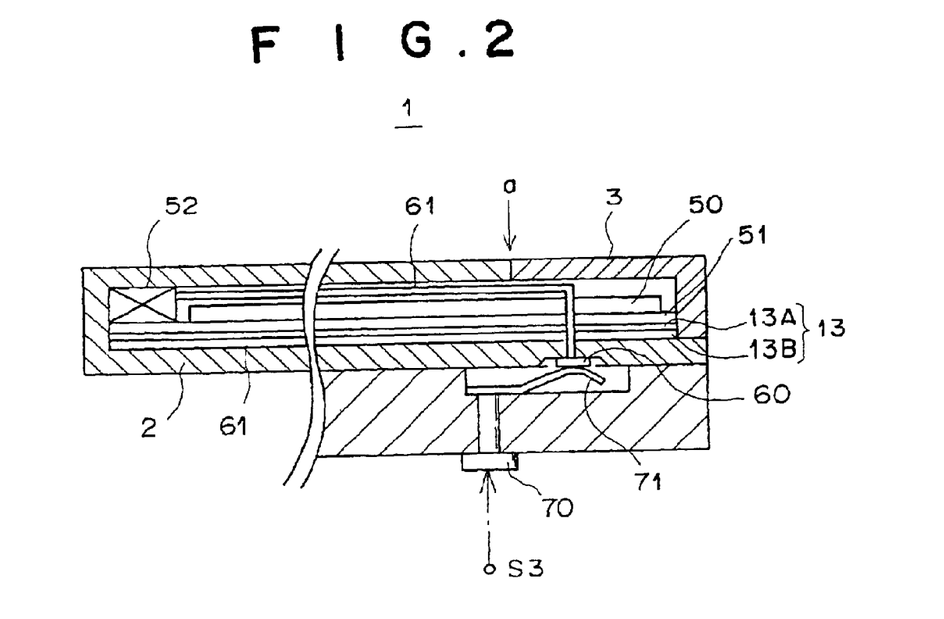
FIG. 2 is a cross-sectional view of a main part of the cassette shown in FIG. 1.
Figure 3:
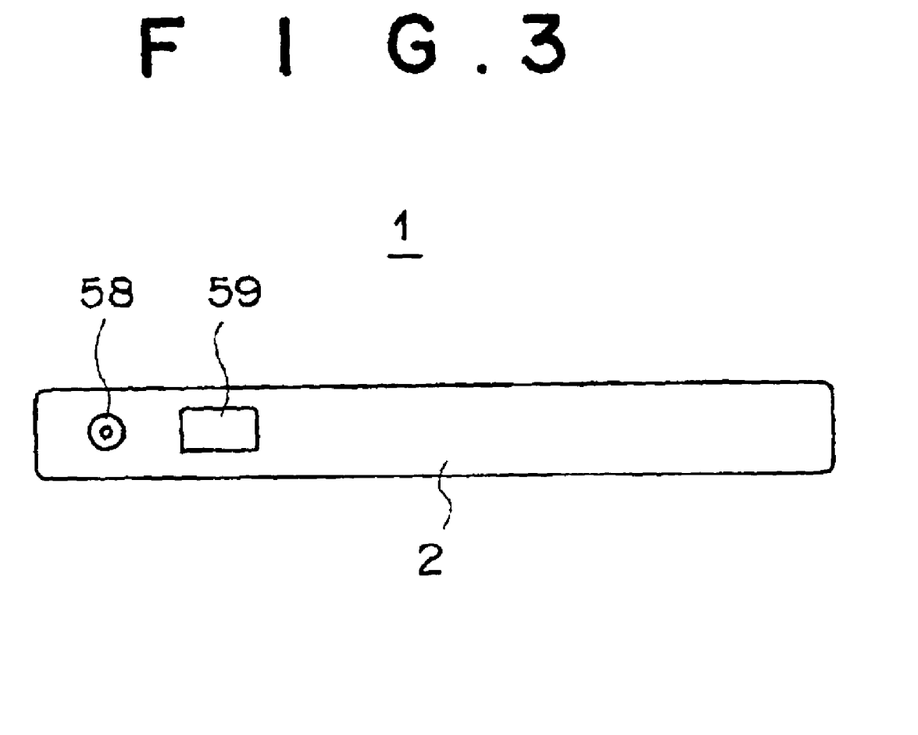
FIG. 3 is shows a rear side of the cassette shown in FIG. 1.

Hereinafter, an embodiment of the present invention will be explained with reference to the accompanying drawings. FIG. 1 is a perspective view of a cassette 1 of an embodiment of the present invention. FIGS. 2 and 3 show a cross-sectional view of the cassette 1 and a rear side of the cassette 1, respectively.

As shown by in its entirety in FIG. 1, the cassette 1 comprises a thin casing box 2 and a lid 3 for opening and closing an opening 2a of the casing box 2. A stimulable phosphor sheet is inserted and taken out from the opening 2a. The casing box 2 and the lid 3 are made of synthetic resin, for example. The lid 3 is attached to the casing box 2 in a state where the lid can freely swing around an axis A. By a swing of the lid 3, the opening 2a can be opened and closed. In order to cause the lid 3 to be able to swing freely in the above manner, a known hinge mechanism may be used. Alternatively, the lid 3 and the casing box 2 are made of synthetic resin to be unified so that the lid 3 can be folded at a hinge line.

Meanwhile, a stimulable phosphor sheet 13 stored in the cassette 1 has a stimulable phosphor layer 13B formed on a transparent substrate 13A of the sheet, as shown in FIG. 2. A Li-ion polymer battery 50 having a thickness of 2~3 mm is held inside the casing box 2. A thin emitter 51 is also placed under the battery 50. The emitter 51 comprises an organic EL material, for example. The emitter is of approximately the same size as the stimulable phosphor sheet 13. The Li-ion battery 50 and the emitter 51 are made of flexible materials. Therefore, the Li-ion polymer battery 50 and the emitter 51 are flexible. At a rear side of the battery 50 inside the casing box 2, a control circuit 52 and a buzzer 53 as warning means are also placed.

The Li-ion polymer battery 50, the emitter 51, and the buzzer 53 are connected to the control circuit 52. As shown in FIG. 2, the control circuit 52 is connectable to outside of the cassette 1 via a connection line 61 not in contact with the battery 50 and the emitter 51 and via a plurality of control terminals 60 placed at a bottom of the casing box 2.

An emission start switch 55 and display means 54 comprising a light emitting diode (LED) or the like are placed on an upper surface of the casing box 2. A bar code label 56 showing identification information of the cassette 1 is also pasted on the upper surface of the casing box 2.

As shown in FIG. 3, a power supply terminal 58 for supplying an electric current for charging the Li-ion polymer battery 50 and an infrared reception unit 59 for receiving a control signal transmitted from the outside of the cassette 1 to the control circuit 52 are also placed on the rear side of the casing box 2.

Figure 4:
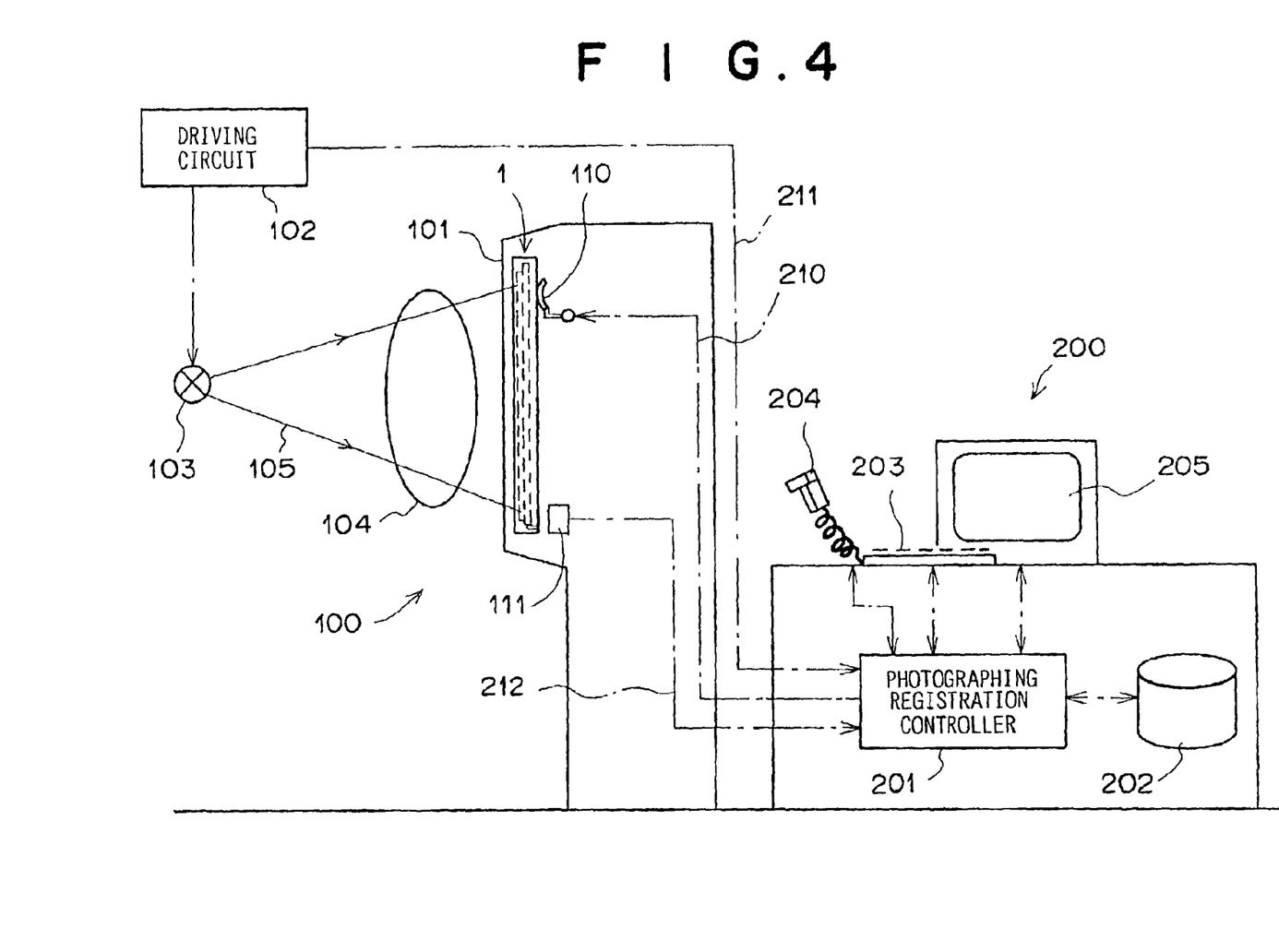
FIG. 4 is a diagram showing a radiation image photographing apparatus and a photographing information registration apparatus of the present invention.

FIG. 4 shows a radiation image photographing apparatus 100 using the cassette 1 for photographing a radiation image on the stimulable phosphor sheet 13 stored in the cassette 1, and a photographing information registration apparatus 200 for registering information regarding the photographing using the cassette 1. Hereinafter, how the radiation image is photographed and how the photographing information is registered will be explained with reference to FIG. 4.

The cassette 1 is set at a photographing table 101 of the radiation image photographing apparatus 100, storing the stimulable phosphor sheet 13 therein. A radiation source 103 such as an X-ray tube bulb driven by a radiation source driving circuit 102 is placed facing the photographing table 101. A subject 104 such as a human body is placed on the photographing table 101, and the radiation source is driven in this state. Radiation 105 that has been emitted from the radiation source 103 and has passed through the subject 104 is irradiated on the stimulable phosphor sheet 13 in the cassette 1, and a radiation image of the subject 104 is recorded (photographed) in the stimulable phosphor sheet 13.

The radiation image photographing apparatus 100 has a plurality of contacts 110 placed in the photographing table 101, and the contacts 110 are in contact with the terminals 60 of the cassette 1. Furthermore, the radiation image photographing apparatus 100 comprises cassette detection means 111 placed in the table 101 and comprising a proximity switch or the like for detecting that the cassette 1 is in a stand-by state in a predetermined position in the photographing table 101. Operation of the contacts 110 and the cassette detection means 111 will be explained in detail later.

Meanwhile, the photographing information registration apparatus 200 comprises a computer system and has a photographing registration controller 201 comprising a central processing unit, a magnetic disc 202, a keyboard 203, a bar code reader 204, and a display device 205 comprising a CRT and the like.

In the photographing information registration apparatus 200, the content of the bar code label 56 pasted on the cassette 1, that is, the identification information of the cassette 1 is read by the bar code reader 204 before or after photographing the radiation image with the cassette 1. Subject information (gender and a name of the subject, a name of a ward such as internal or surgical, and the like) regarding the radiation image photographed in the stimulable phosphor sheet 13 stored in the cassette 1 is input from the keyboard 203 to the photographing information registration apparatus 200 in addition to the photographing information such as the date of photographing, a body portion that has been photographed, and a radiation dosage. The above information is stored in the magnetic disc 202 in relation to the identification information of the cassette 1. The information input to the apparatus 200 is shown on the display device 205, and an operator can confirm the information while viewing the display device 205.

The information input in the above manner is used for obtaining the information regarding the radiation image of the subject when the image is reproduced. Alternatively, the information is used for searching for the radiation image based on a search condition such as the subject information or the photographing information, by using a terminal not shown and connected to the photographing information registration apparatus 200. The information is stored in the magnetic disc 202 and transferred to a radiation image information reading apparatus 300 shown in FIG. 5 via a communication line not shown. The information is used in the reading apparatus 300 for appropriately setting a reading condition upon reading radiation image information from the stimulable phosphor sheet 13, for example.

Figure 5:
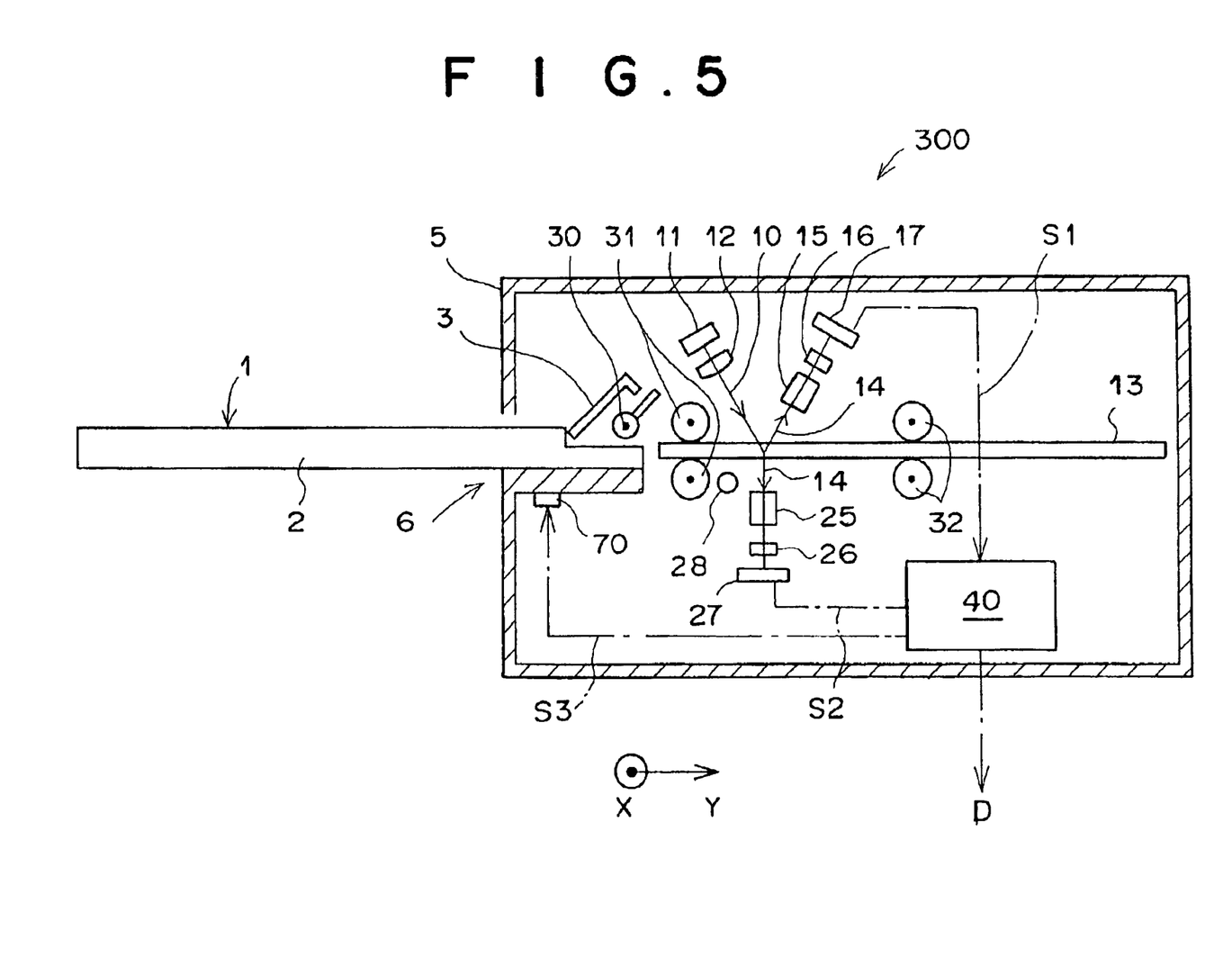
FIG. 5 is a side view of an apparatus for reading radiation image information from a stimulable phosphor sheet stored in the cassette shown in FIG. 1.

FIG. 5 shows the apparatus 300 for reading the radiation image information from the stimulable phosphor sheet 13 stored in the cassette 1. Hereinafter, how the radiation image information is read will be explained with reference to FIG. 5.

The cassette 1 is inserted after photographing in a frame 5 of the radiation image information reading apparatus 300, the side having the opening 2a first. A holder 6 holds the stimulable phosphor sheet in a predetermined position. When the cassette 1 is held in the predetermined position, lid opening/closing means not shown moves the lid 3 around the hinge, and the opening 2a opens.

The frame 5 comprises a light-shielding material (not shown) for shutting light entering the cassette 1 from a gap between the cassette 1 and the frame 5 when the cassette 1 is held in the above manner.

Figure 6:
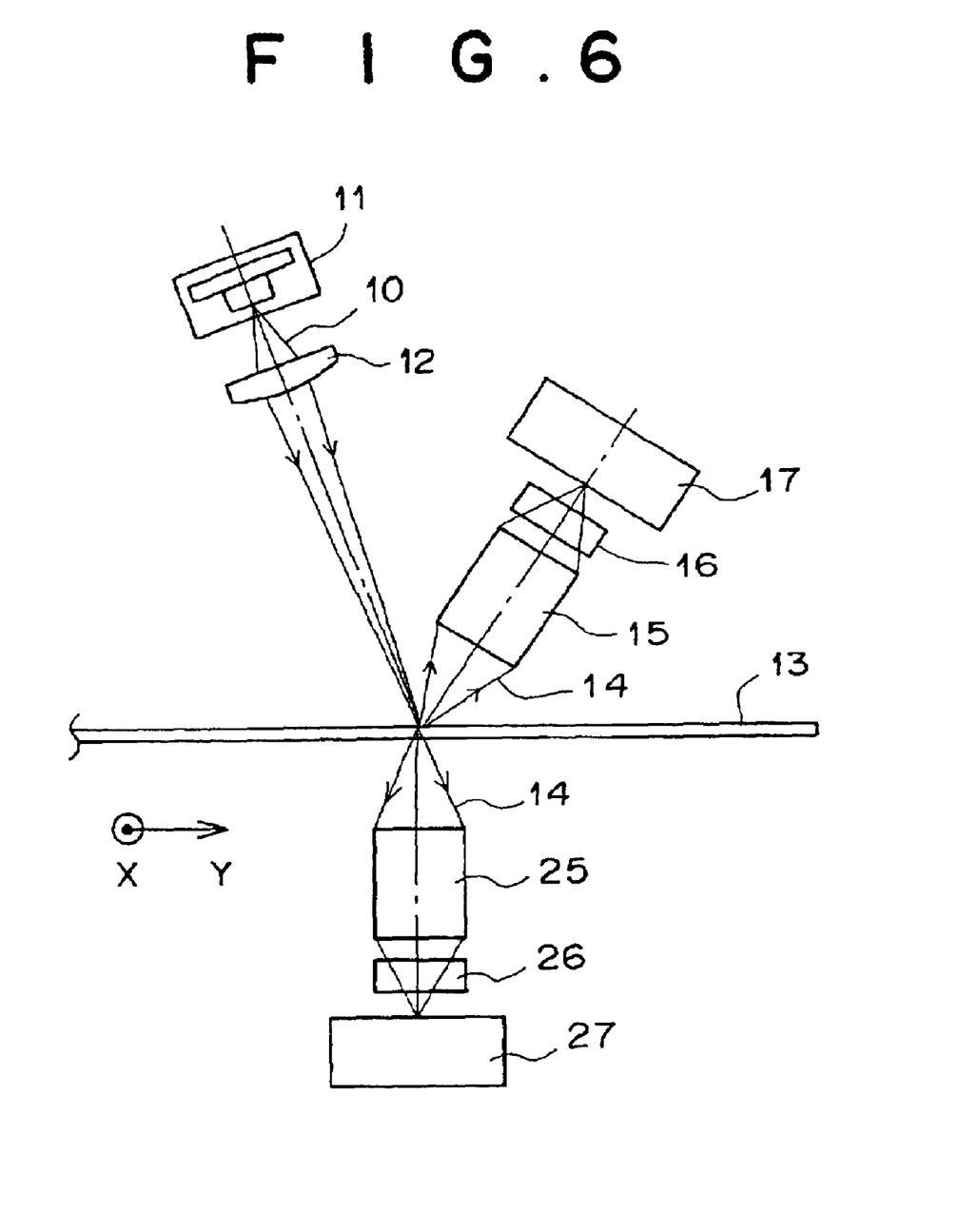
FIG. 6 is a side view showing a main part of the apparatus shown in FIG. 5.
Figure 7:
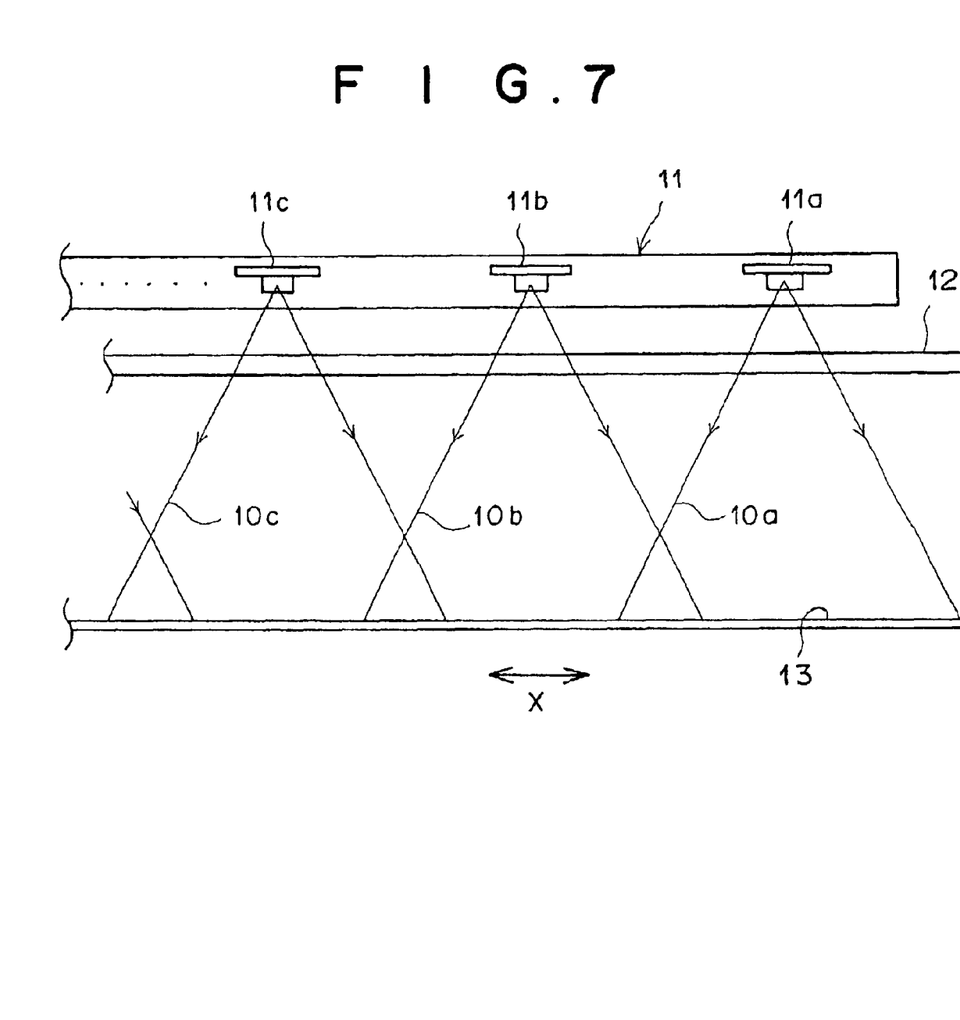
FIG. 7 is a front view of a linear light source used for the apparatus shown in FIG. 5.

A reading unit placed within the frame 5 will be explained next. FIGS. 6 and 7 respectively show a side view and a front view of an optical system comprising the reading unit, and are used for explanation of the reading unit.

The reading unit comprises a laser diode array 11 as excitation light scanning means for emitting an excitation light 10 in a fan-beam state, a cylindrical lens 12 for concentrating the excitation light 10 only in a plane shown in FIG. 6, a first lens array 15 for focusing phosphorescent light 14 emitted to a side of excitation light irradiation from a portion of the stimulable phosphor sheet 13 on which the excitation light 10 has been irradiated linearly (hereinafter referred to as the irradiation area), a first excitation light cutting filter 16 placed on a path of the phosphorescent light 14 from the lens array 15, and a first CCD line sensor 17 for detecting the phosphorescent light 14 having passed through the filter 16.

On a side opposite of the excitation light irradiation side, a second lens array 25 for focusing the phosphorescent light 14, a second excitation light cutting filter 26 placed on a path of the phosphorescent light 14 from the lens array 25, a second CCD line sensor 27 for detecting the phosphorescent light 14 having passed through the filter 26, and an erasing light source 28 having a length equal to or larger than an entire length of the stimulable phosphor sheet 13 and for emitting an erasing light having a wavelength in an excitation wavelength band of the stimulable phosphor sheet 13.

As shown in FIG. 7, the laser diode array 11 comprises a plurality of laser diodes 11a, 11b, 11c . . . forming one line, and each of the laser diodes has an oscillation wavelength of 650~690 nm. Respective excitation lights 10a, 10b, 10c . . . emitted divergently from the laser diodes 11a, 11b, 11c . . . are collected by the cylindrical lens 12 in one direction to form fan beams. The excitation light 10 composed of the fan beams is linearly irradiated on the irradiation area of the sheet 13.

The laser diode array 11 is located close to the opening 2a of the cassette 1 held by the holder 6, and emits the excitation light 10 to the sheet 13.

Figure 8:
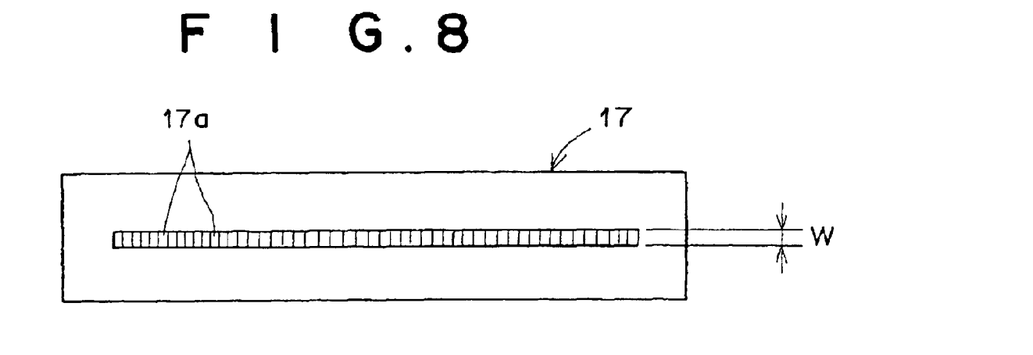
FIG. 8 is a top view showing a line sensor used in the apparatus shown in FIG. 5.

The first CCD line sensor 17 comprises a plurality of sensor chips (photoelectric conversion devices) 17a aligned as shown in FIG. 8. In this example, a light reception width of the first CCD line sensor 17 in a direction orthogonal to an alignment direction of the sensor chips, that is, a width W of the sensor chips 17a is approximately 100 $\mu$m.

The first CCD line sensor 17 is placed in such a manner that the sensor chips are aligned along a lengthwise direction (a direction shown by X) of the irradiation area of the sheet 13. The first CCD line sensor 17 may comprise a plurality of CCD line sensors in order to deal with the case where the stimulable phosphor sheet has a large width.

Figure 9:
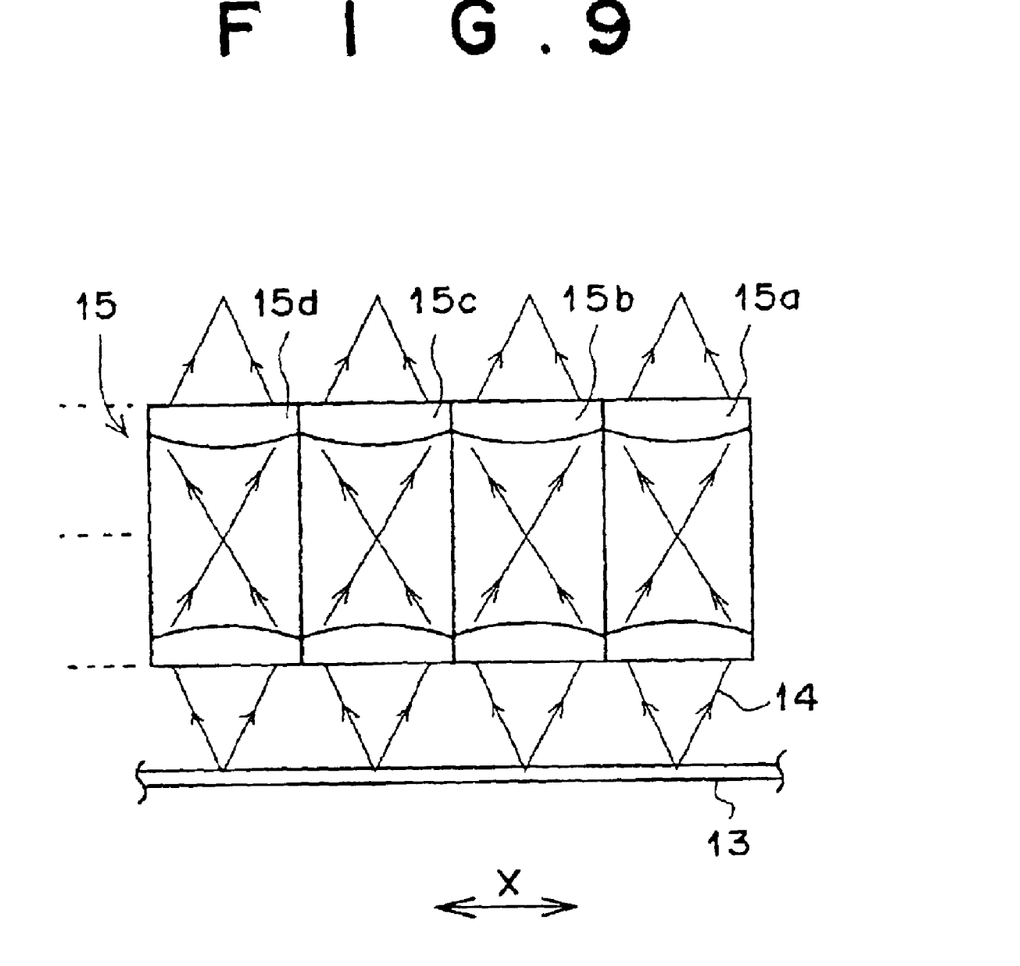
FIG. 9 is a top view showing a light collection lens array used in the apparatus shown in FIG. 5.

The first lens array 15 comprises a plurality of continuous refractive-index distribution lenses 15a, 15b, 15c. . . aligned as shown in FIG. 9, for example. The lenses lead the phosphorescent light 14 emitted from the irradiation area of the sheet 13 to the first CCD line sensor 17, as shown in FIG. 5.

The second CCD line sensor 27 and the second lens array 25 have the same configurations as the first CCD line sensor 17 and the first lens array 15.

An ejection roller 30 for taking out the stimulable phosphor sheet 13 from the cassette 1 is placed close to the holder 6. The ejection roller 30 enters the cassette 1 from the opening 2a when the opening 2a opens at the time the cassette 1 is held by the holder 6 in the above manner. The ejection roller 30 is pressed against the sheet 13 and rolls over the sheet in order to take out the sheet 13 from the opening 2a to the outside of the cassette 1.

A pair of nip rollers 31 are placed close to the ejection roller 30, for conveying the sheet 13 in a direction shown by an arrow Y in FIG. 5 by sandwiching the sheet 13. Another pair of nip rollers 32 comprising sheet conveyance means together with the nip rollers 31 are also placed in the direction of conveyance of the sheet 13.

Hereinafter, operation of the radiation image information reading apparatus 300 will be explained. As has been described above, the cassette 1 after the photographing is set in the apparatus 300 and the sheet 13 is taken out of the cassette 1 by the ejection roller 30.

At this time, the Li-ion polymer battery 50 made of the flexible material and an end of the emitter 51 on a side of the opening 2a are bent round and raised by means not shown. In this manner, the ejection roller 30 can reach a position in contact with the sheet 13. In order to allow the ejection roller 30 to reach the position in contact with the sheet 13, the Li-ion polymer battery 50 may be formed in such a manner that a right end of the battery 50 is situated approximately in the same position as a position of the hinge of the lid 3 shown by an arrow a in FIG. 2. In this case, only the emitter 51 is bent in the above manner.

When the sheet 13 is taken out of the cassette 1, a front end of the sheet 13 is conveyed between the nip rollers 31 and the ejection roller 30 moves away from the sheet 13. Thereafter, the sheet 13 is conveyed by the nip rollers 31 at a predetermined speed in the direction shown by the arrow Y. After the sheet 13 is conveyed for a certain distance, the front end is conveyed to the nip rollers 32. Thereafter, the sheet 13 is conveyed between the nip rollers 31 and 32 at the predetermined speed.

At this time, the sheet 13 is held by a guide part under the sheet (not shown), and maintains a flat shape thereof while being conveyed.

While the sheet 13 is conveyed at the predetermined speed in the above manner, the excitation light 10 emitted from the laser diode array 11 is irradiated linearly on the irradiation area of the stimulable phosphor sheet 13 so that the sheet is subjected to main scan in the direction shown by X in FIG. 5. At the same time, the sheet 13 is vertically scanned with the excitation light 10 while being conveyed in the direction of the arrow Y orthogonal to the main scan direction. In this manner, the sheet 13 is scanned two-dimensionally with the excitation light 10.

The phosphorescent light 14 in accordance with the radiation image information stored in the irradiation area of the sheet 13 is emitted from the irradiation area. For example, a portion of the phosphorescent light 14 in blue is collected by the first lens array 15 and led to the first CCD line sensor 17 to be detected photoelectrically by the sensor 17. The excitation light 10 reflected by the stimulable phosphor sheet 13 and propagating toward the first CCD line sensor 17 is cut by the first excitation light cutting filter 16.

Another portion of the phosphorescent light 14 that has passed through the transparent substrate and propagates toward a side opposite of the excitation light irradiation side is collected by the second lens array 25 and led to the second CCD line sensor 27 to be detected photoelectrically by the sensor 27. Another portion of the excitation light 10 that has passed through the stimulable phosphor sheet 13 and propagates toward the second CCD line sensor 27 is cut by the second excitation light cutting filter 26.

The first CCD line sensor 17 outputs an analog light detection signal S1 in accordance with an amount of the phosphorescent light 14 indicating the radiation image information. The signal S1 is amplified by a reading circuit 40 and subjected to A/D conversion processing to be converted into a digital image signal. Likewise, the second CCD line sensor 27 outputs an analog light detection signal S2 in accordance with an amount of the phosphorescent light 14. The signal S2 is amplified by the reading circuit 40 and subjected to the A/D conversion processing to be converted into a digital image signal.

The reading circuit 40 adds the two digital image signals for each of pixels. An image signal D obtained by this addition is output to outside of the reading apparatus 300 and subjected to tone processing and frequency processing and the like if necessary. Thereafter, the image signal D is sent to image display means such as a CRT display device or an image recording apparatus such as an optical scan recording apparatus. In this manner, an image represented by the image signal D, that is, the radiation image recorded in the stimulable phosphor sheet 13 is reproduced.

After the stimulable phosphor sheet 13 is conveyed to a vertical scan ending position and reading of the radiation image information is completed, the nip rollers 31 and 32 are driven in a direction reverse to the direction described above, and the sheet 13 is sent back to the cassette 1. The erasing light source 28 is turned on, and the erasing light emitted from the erasing light source 28 is irradiated on the stimulable phosphor layer 13B through the transparent substrate 13A. When the erasing light is irradiated on the sheet 13, radiation energy remaining in the stimulable phosphor layer 13B of the sheet 13 is released.

Before the sheet 13 is entirely returned to the cassette 1, the erasing light is irradiated on an entire surface of the sheet 13. If an emission time of the erasing light is set long to a certain degree, the sheet 13 can be used as it is for recording another radiation image. However, in the cassette 1 of the present invention, the erasing light is irradiated on the sheet 13 from the emitter 51 so that a time necessary for an erasing process in the radiation image information reading apparatus 300 can be shortened, which will be explained later in detail.

When the sheet 13 is moved away from the nip rollers 31, the ejection roller 30 comes in contact with the sheet 13 and driven in a direction reverse to the direction described above. In this manner, the sheet 13 is returned to the cassette 1. The lid opening closing means swings the lid 3 around the hinge and closes the opening 2a. Thereafter, the cassette 1 is taken out from the frame 5 and used for recoding another radiation image.

As has been described above, in this apparatus, the excitation light 10 is irradiated to main-scan the sheet 13 in a position close to the opening 2a of the cassette 1 when the sheet 13 of rigid type is being conveyed from the cassette 1. At the same time, the sheet 13 is vertically scanned with the excitation light 10 during the conveyance. Therefore, a space having only the same size as the stimulable phosphor sheet 13 is necessary in the direction of taking out the sheet 13 from the cassette 1, which enables substantial downsizing of the reading apparatus 300.

Furthermore, since the reading apparatus 300 detects the phosphorescent light 14 from both sides of the sheet 13, detection efficiency is improved and the image signal D having a preferable S/N ratio can be obtained.

In the reading apparatus 300, the laser diode array 11 is used as the excitation light main scan means for irradiating the excitation light 10 in a fan-beam state. Therefore, a space for deflecting an excitation light beam used in the case of main scan of a stimulable phosphor sheet with the deflected excitation light beam becomes unnecessary, which can also be advantageous in terms of downsizing of the reading apparatus 300.

Moreover, since the CCD line sensors 17 and 27 are used as the photoelectric detection means in the reading apparatus 300 of the present invention, a configuration of the unit for detecting the phosphorescent light becomes simpler than in the case of using a large light collection unit for leading the phosphorescent light to photoelectric detection means such as a photomultiplier, which also contributes to the downsizing.

However, not only a linear light source such as the laser diode array 11 but also a configuration in which the sheet 13 is subjected to the main scan by an excitation light beam deflected in the above manner may be adopted. Furthermore, the photomultiplier or the like may also be used as the photoelectric detection means.

An erasing operation in the cassette 1 will be explained next. When the radiation image information is read as has been described above from the stimulable phosphor sheet 13 in the radiation image information reading apparatus 300 shown in FIG. 5, the reading circuit 40 finds a maximum level of residual radiation energy (in accordance with a dosage of the radiation irradiated on the sheet at the time of photographing) remaining in the sheet after the reading, based on the detection signals S1 and S2 input thereto. A signal S3 representing a value of the maximum residual energy level is output from the reading circuit 40. The signal S3 is input to the control circuit 52 through a terminal 70 and a contact 71 of the holder 6 (see FIG. 2), and through the connection line 61 and the control terminals 60 of the cassette 1 in contact with the contact 71 when the cassette 1 is set on the holder 6.

The control circuit 52 calculates an emission time of the emitter 51 enabling reduction of the residual radiation energy to a level not affecting reuse of the sheet 13, based on the signal S3 input thereto. The time calculated in the above manner is stored in an internal memory. In this embodiment, the erasing light is emitted from the erasing light source 28 of the radiation image information reading apparatus 300 and irradiated on the sheet 13, as has been described above. Therefore, the emission time is calculated to become optimal by taking consideration of the erasing process by the erasing light source 28.

After the sheet 13 is returned to the cassette 1 in the radiation image information reading apparatus 300, the cassette 1 is taken out from the holder 6 of the reading apparatus 300. The emission start switch 55 of the cassette 1 is then turned on manually, for example. In order to prevent erroneous operation, a switch that becomes ON after an operation panel or the like is pressed down for several seconds is preferably used as the emission start switch 55, for example. The infrared reception unit 59 placed at the rear side of the casing box 2 of the cassette 1 or a switch that becomes ON by wireless communication may also be used as the emission start switch 55.

The control circuit 52 of the cassette 1 causes the Li-ion polymer battery 50 to supply the electric current to the emitter 51 when the emission start switch 55 is turned on. The emitter then emits the erasing light, and the erasing light is irradiated on the stimulable phosphor layer 13B of the sheet 13 through the substrate 13A. When the erasing light having the wavelength in the excitation wavelength band of the sheet 13 is irradiated, the residual radiation energy remaining in the sheet 13 is released.

The control circuit 52 cuts the electric current to the emitter 51 from the LI-ion polymer battery 50 in order to stop the emission after the emission time calculated in the above manner has elapsed since the start of the emission. The sheet 13 in the cassette 1 becomes reusable for recording another radiation image, since the control circuit 52 has calculated the emission time of the emitter 51 in the above manner.

An amount of the erasing light emitted from the thin emitter 51 made of the organic EL material or the like is smaller than an amount of the erasing light emitted from the erasing light source 28 in the radiation image information reading apparatus 300. Therefore, the emission time needs to be set considerably long if the erasing process is carried out only within the cassette 1. Therefore, in order to shorten the time necessary for the erasing process in the cassette 1, the erasing process in the radiation image information reading apparatus 300 is also preferably carried out, as has been described in this embodiment. In a general hospital or the like, the erasing process can be completed during the time the cassette 1 is being brought from the radiation image information reading apparatus 300 to a photographing room even if the time necessary for the erasing process in the cassette 1 is set to less than 5 minutes, preferably 2 to 3 minutes.

As has been described above, if the erasing process is completed during the time the cassette 1 is being brought to the photographing room without bringing the cassette 1 to a power supply unit for erasing-light emission, the operation from reading the radiation image information to recording another radiation image can be carried out efficiently.

Furthermore, in the cassette 1 in this embodiment, the display means 54 on the upper surface of the casing box 2 of the cassette 1 continues blinking, for example, during the time that emitter 51 is emitting the erasing light. In this manner, the emission of the erasing light from the emitter 51 can be confirmed from the outside of the cassette 1. Consequently, the cassette 1 can be prevented from being used for recording another radiation image before completion of the erasing processing by the emission from the emitter 51. The control circuit 52 controls the blinking of the display means 54.

It is preferable for the display means 54 described above to indicate not only the emission from the emitter 51 but also completion of the emission. For example, the display means 54 may be turned on at the time of completion while being turned off during the emission. In this case, since completion of the emission can be confirmed from the outside of the cassette 1, the same effect as has been described above can be obtained. Furthermore, the display means may continue blinking during the emission while being turned on after completion of the emission. Alternatively, the display means may turn red during the emission and may turn green after completion of the emission.

In the cassette 1 in this embodiment, the emitter 51 is set so as to irradiate the erasing light on the stimulable phosphor layer 13B through the transparent substrate 13A, since the stimulable phosphor sheet 13 comprises the stimulable phosphor layer 13B formed on the substrate 13A. However, another emitter may also be used, facing a surface of the sheet 13 on a side of the stimulable phosphor layer 13B so that the erasing light having a greater amount of light can be irradiated on the stimulable phosphor layer 13B. Meanwhile, in the case where the substrate is not transparent, the emitter 51 needs to be set facing the surface of the sheet on the side of the stimulable phosphor layer 13B.

As shown in FIG. 4, the contacts 110 are in contact with the control terminals 60 (see FIG. 2) of the cassette 1 set at the photographing table 101. In this manner, the photographing registration controller 201 of the photographing information registration apparatus 200 is connected to the control circuit 52 via a signal line 210 and the contacts 110, and via the connection line 61 of the cassette 1 (see FIG. 2). Meanwhile, the driving circuit 102 driving the radiation source 103 can input a signal regarding a dosage of the radiation to the photographing registration controller 201 via a signal line 211.

In this embodiment, it is possible for the control circuit 52 to calculate the appropriate emission time of the emitter 51 based on the radiation dosage after the signal regarding the radiation dosage is input to the control circuit 52. The emission time calculated in the above manner is stored in the control circuit 52 as in the above example, and the emission is stopped after the emission time has elapsed since the start of the emission from the emitter 51.

An instruction from the photographing registration controller 201 to the control circuit 52 determines whether the emission time is calculated based on the signal from the driving circuit 102 or based on the signals S1 and S2 from the radiation image information reading apparatus 300.

In this embodiment, the signal regarding the radiation dosage is input from the photographing information registration apparatus 200 to the control circuit 52 of the cassette 1. However, this signal can be input from the radiation image photographing apparatus 100 to the control circuit 52 of the cassette 1. In this case, the same effect as in the above embodiment can also be obtained.

The signal or the signals to be input to the control circuit 52 in order to calculate the appropriate emission time may be input via the control terminals 60 (see FIG. 2) of the cassette 1, as has been described above. Alternatively, the signal or the signals may be input via the infrared reception unit 59 placed at the rear of the casing box 2 of the cassette 1 as shown in FIG. 3, by using infrared communication according to IrDA standard or the like. Furthermore, radio reception means according to a wireless communication standard such as Bluetooth, Wireless 1394 or IEEE 802.11 may also be adopted for the cassette 1 so that the signal or the signals can be input to the control circuit 52 via wireless communication.

Meanwhile, the LI-ion polymer battery 50 can be charged by supplying an electric current from a commercial AC power source or the like via the power supply terminal 58 shown in FIG. 3. Using a rechargeable secondary battery such as the Li-ion polymer battery 50 as the power supply for the emitter 51 is extremely economical.

The Li-ion polymer battery can be formed extremely thin, as thin as 2~3 mm. Therefore, the cassette 1 can also be thin and light. Since the Li-ion polymer battery can also be shaped to have a large area, the battery can be as large as the stimulable phosphor sheet 13. In this manner, the amount of the erasing light can become large and the emitter can emit the erasing light for a long time, which leads to a longer interval between charging operations.

Meanwhile, the emitter 51 comprising the organic EL material or the like can also be shaped thin. Therefore, the cassette 1 using the emitter 51 of such a thin configuration can also be extremely thin. The emitter 51 comprising the organic EL material can also be produced in a state where almost no driving circuit or no wire is used therein. Therefore, even if photographing is carried out in a state where the emitter 51 is placed between the sheet 13 and the radiation source 103, the radiation image can be prevented from having an image of a driving circuit or a wire therein.

Operation of how the cassette 1 is reused after the erasing processing for recording another radiation image will be explained next, with reference to FIG. 4. As has been described above, the erasing process can be completed during the time the cassette 1 is being brought from the radiation image information reading apparatus 300 to the photographing room where the radiation image photographing apparatus 100 shown in FIG. 4 is placed, if the time necessary for the erasing process is set appropriately.

The cassette 1 after the erasing process is set in the predetermined position of the photographing table 101 of the radiation image photographing apparatus 100, and the cassette detection means 111 comprising the proximity switch or the like detects presence of the cassette 1. A signal indicating the presence of the cassette 1 is then input from the cassette detection means 111 to the photographing registration controller 201 via a signal line 212. The photographing registration controller 201 inputs a signal indicating a stand-by state of the cassette 1 to the control circuit 52 of the cassette 1 via the signal line 210 upon reception of the signal indicating the presence of the cassette 1. The control circuit 52 causes the buzzer 53 to issue a warning sound if the emitter 51 is still emitting the erasing light upon reception of the signal of the stand-by state.

The operator of the apparatus does not operate the radiation source 103 while he/she hears the warning sound, and starts the radiation source 103 for radiation image photographing after the sound stops. In this manner, the stimulable phosphor sheet 13 before completion of the erasing process and thus having the residual radiation energy at a high level can be prevented from being reused for photographing another radiation image.

In this embodiment, the warning means of the cassette 1 comprises the control circuit 52 and the buzzer 53, and detection means for inputting the information indicating the stand-by state of the cassette 1 to the warning means by detecting the stand-by state comprises the photographing registration controller 201. The detection means may be adopted for the radiation image photographing apparatus 100 or the cassette 1, instead of the photographing information registration apparatus 200.

Furthermore, means for forcibly stopping the emission from the emitter 51 in the case where the emitter 51 is still emitting the erasing light when the information of the stand-by state is input thereto may also be used instead of the warning means. In this case, radiation image photographing can be prevented from being hampered due to the emission time control of the emitter 51.

The stimulable phosphor sheet 13 in the cassette 1 often stores energy of natural radiation or the like if the cassette 1 is not used for photographing another radiation image immediately after completion of the erasing processing ending with stoppage of the emission from the emitter 51 (this process is called primary erasing). The cassette 1 in this embodiment can carry out so-called secondary erasing in which the radiation energy is released before reuse of the stimulable phosphor sheet 13.

In other words, the control circuit 52 of the cassette 1 comprises time measuring means for measuring a time elapsed after completion of the emission from the emitter 51, and the emitter 51 emits the erasing light again for a predetermined amount of time when the elapsed time measured by the time measuring means reaches a predetermined amount of time. By carrying out the erasing process again based on the control by the control circuit 52, the radiation energy naturally stored in the sheet 13 in the cassette 1 can be released. In this manner, the sheet 13 having a low level of residual radiation energy can always be used for photographing.

In the above embodiment, the Li-ion polymer battery 50 is used as the battery in the cassette 1. However, a battery of another type can also be adopted. Furthermore, the emitter 51 does not necessarily comprise the organic EL material. Non-organic EL material or a material other than the EL materials can also be used for the emitter 51.

What is claimed is:
1. A cassette for storing a stimulable phosphor sheet having a stimulable phosphor layer formed on a sheet-form substrate, the stimulable phosphor sheet being used for recording a radiation image therein, the cassette comprising:
- an emitter for emitting an erasing light to the sheet stored in the cassette;
- a power supply for causing the emitter to emit the erasing light;
- a control circuit for controlling a time of emission from the emitter powered by the power supply; and
- a releasing mechanism for allowing the stimulable phosphor sheet to be removed from the cassette to have the radiation image recorded thereon read out.

2. A cassette as defined in claim 1, wherein the control circuit controls the time of the emission based on control information input from outside thereof.

3. A cassette as defined in claim 2, wherein the control circuit controls the time of the emission based on the control information output from an apparatus for photographing the radiation image in the stimulable phosphor sheet.

4. A cassette as defined in claim 2, wherein the control circuit controls the time of the emission based on the control information output from an apparatus for registering photographing information regarding the stimulable phosphor sheet.

5. A cassette as defined in claim 2, wherein the control circuit controls the time of the emission based on the control information output from an apparatus for reading radiation image information from the stimulable phosphor sheet.

6. A cassette as defined in any one of claims 2 to 5, further comprising a terminal for receiving the control information from the outside thereof.

7. A cassette as defined in any one of claims 2 to 5, further comprising a radio reception means for receiving the control information from the outside thereof.

8. A cassette as defined in any one of claims 2 to 5, further comprising an infrared reception means for receiving the control information from the outside thereof.

9. A radiation image photographing apparatus using the cassette defined in claim 3, the radiation image photographing apparatus comprising:
- means for inputting information related to a radiation dosage for the stimulable phosphor sheet as the control information to the control circuit of the cassette.

10. A photographing information registration apparatus for registering information regarding radiation image photographing using the cassette defined in claim 4, the photographing information registration apparatus comprising:
- means for inputting information related to a radiation dosage for the stimulable phosphor sheet as the control information to the control circuit of the cassette.

11. A radiation image information reading apparatus for reading the radiation image information from the stimulable phosphor sheet stored in the cassette defined in claim 5, the radiation image information reading apparatus comprising:
- means for inputting information related to a dosage of radiation for the stimulable phosphor sheet as the control information to the control circuit of the cassette.

12. A cassette according to claim 6 wherein the terminal comprises an electrical contact disposed on an outside surface of the cassette.

13. A cassette as defined in claim 1, wherein the power supply comprises a rechargeable secondary battery.

14. A cassette as defined in claim 13, wherein the secondary battery is a lithium-ion battery.

15. A cassette as defined in claim 13 or 14, further comprising means for receiving a charging electric current supplied from outside of the secondary battery to the secondary battery.

16. A cassette as defined in claim 1, wherein the emitter comprises a non-organic or organic electroluminescence material.

17. A cassette as defined in claim 1, wherein the emitter is placed facing a surface of the stimulable phosphor sheet on a side of the stimulable phosphor layer.

18. A cassette as defined in claim 1, the stimulable phosphor sheet having the stimulable phosphor layer formed on the substrate that allows the erasing light to pass through, and
- the emitter being placed facing a surface of the stimulable phosphor sheet on a side of the substrate.

19. A cassette as defined in claim 1, the stimulable phosphor sheet having the stimulable phosphor layer formed on the substrate that allows the erasing light to pass through, and
- the emitter being placed facing a surface of the stimulable phosphor sheet on a side of the stimulable phosphor layer and facing a surface of the stimulable phosphor sheet on a side of the substrate.

20. A cassette as defined in claim 1, further comprising display means for indicating that the emission from the emitter is going on and/or completed.

21. A cassette as defined in claim 1, further comprising:
- time measuring means for measuring a time elapsed after completion of the emission from the emitter; and
- re-erasing control means for causing the emitter to emit the erasing light again when the elapsed time measured by the time measuring means reaches a predetermined amount of time.

22. A cassette as defined in claim 1, further comprising warning means for issuing a warning if the emitter is still emitting the erasing light when information indicating that the cassette is in a photography stand-by state is input thereto.

23. A cassette as defined in claim 22, further comprising detection means for detecting the photography stand-by state of the cassette for radiation image photographing and for inputting the information indicating the stand-by state to the warning means.

24. A radiation image photographing apparatus using the cassette defined in claim 22, the radiation image photographing apparatus comprising:
- detection means for detecting the stand-by state of the cassette for radiation image photographing and for inputting the information indicating the photography stand-by state to the warning means of the cassette.

25. A photographing information registration apparatus for registering information regarding radiation image photographing using the cassette defined in claim 22, the photographing information registration apparatus comprising:
- detection means for detecting the stand-by state of the cassette for the radiation image photographing and for inputting the information indicating the photography stand-by state to the warning means of the cassette.

26. A cassette as defined in claim 1, wherein the emitter has a surface area substantially equal to a surface area of the stimulable phosphor sheet.

27. A cassette as defined in claim 26, wherein the emitter is made of flexible materials.

28. A cassette as defined in claim 27, wherein the power supply has a thickness of approximately 2–3 mm and is coplanar to the emitter.

29. A cassette as defined in claim 1, wherein the power supply has a thickness of approximately 2–3 mm and is coplanar to the emitter.

30. A cassette as defined in claim 29, wherein the power supply is made of flexible materials.

31. A cassette as defined in claim 1, wherein the phosphor sheet and the emitter are coplanarly layered above the power supply substantially along an entire length of the power supply.

32. A cassette as defined in claim 1 wherein the releasing mechanism comprises a hinged opening for removal of the sheet from cassette.

33. A cassette as defined in claim 32, wherein the power supply is disposed within the case such that an edge of the power supply is flush with the hinged opening.

34. A cassette as defined in claim 1, wherein the releasing mechanism comprises an opening and a lid disposed at said opening, wherein the lid can be opened so the stimulable phosphor sheet is conveyed through said opening to a read-out apparatus for reading out a radiation image information recorded on the stimulable phosphor sheet.

35. A cassette for storing a stimulable phosphor sheet having a stimulable phosphor layer formed on a sheet-form substrate, the stimulable phosphor sheet being used for recording a radiation image therein, the cassette comprising:

an emitter for emitting an erasing light to the sheet stored in the cassette;

a power supply for causing the emitter to emit the erasing light;

a control circuit for controlling a time of emission from the emitter powered by the power supply; and emission stopping means for stopping the emission from the emitter if the emitter is still emitting the erasing light when information indicating that the cassette is in a photography stand-by state is input thereto.

36. A cassette as defined in claim 35, further comprising detection means for detecting the stand-by state of the cassette for radiation image photographing and for inputting the information indicating the photography stand-by state to the emission stopping means.

37. A radiation image photographing apparatus using the cassette defined in claim 35, the radiation image photographing apparatus comprising:

detection means for detecting the stand-by state of the cassette for radiation image photographing and for inputting the information indicating the photography stand-by state to the emission stopping means of the cassette.

38. A photographing information registration apparatus for registering information regarding radiation image photographing using the cassette defined in claim 35, the photographing information registration apparatus comprising:

detection means for detecting the stand-by state of the cassette for the radiation image photographing and for inputting the information indicating the photography stand-by state to the emission stopping means of the cassette.

* * * * *